United States Patent
Qin (10) Patent No.: US 8,959,515 B2
(45) Date of Patent: Feb. 17, 2015

(54) TASK SCHEDULING POLICY FOR LIMITED MEMORY SYSTEMS

(75) Inventor: Xiaohan Qin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1767 days.

(21) Appl. No.: 11/334,665

(22) Filed: Jan. 18, 2006

(65) Prior Publication Data

US 2007/0169125 A1    Jul. 19, 2007

(51) Int. Cl.
  *G06F 9/46* (2006.01)
  *G06F 15/173* (2006.01)
  *G06F 9/48* (2006.01)
  *G06F 9/50* (2006.01)

(52) U.S. Cl.
  CPC ............ *G06F 9/4881* (2013.01); *G06F 9/5016* (2013.01)
  USPC ........... 718/100; 718/102; 718/104; 718/105; 709/223; 709/224; 709/226

(58) Field of Classification Search
  None
  See application file for complete search history.

(56) References Cited

U.S. PATENT DOCUMENTS

| | | | |
|---|---|---|---|
| 6,338,072 B1 * | 1/2002 | Durand et al. | 707/205 |
| 6,408,324 B1 | 6/2002 | Wallace et al. | |
| 6,584,488 B1 * | 6/2003 | Brenner et al. | 718/103 |
| 6,587,833 B1 * | 7/2003 | Ruffin et al. | 705/11 |
| 6,658,447 B2 * | 12/2003 | Cota-Robles | 718/103 |
| 6,701,403 B2 | 3/2004 | Lary et al. | |
| 6,742,139 B1 | 5/2004 | Forsman et al. | |
| 6,766,420 B2 | 7/2004 | Rawson, III | |
| 6,785,889 B1 * | 8/2004 | Williams | 718/104 |
| 7,665,090 B1 * | 2/2010 | Tormasov et al. | 718/104 |
| 2004/0010785 A1 * | 1/2004 | Chauvel et al. | 717/158 |
| 2004/0187120 A1 | 9/2004 | Moore et al. | |
| 2004/0221290 A1 * | 11/2004 | Casey et al. | 718/104 |
| 2005/0076043 A1 * | 4/2005 | Benedetti et al. | 707/100 |

OTHER PUBLICATIONS

Radoslaw Szymanek; Krzysztof Kuchcinski; "A constructive algorithm for memory-aware task assignment and scheduling"; International Conference on Hardware Software Codesign; Proceedings of the ninth international symposium on Hardware/software codesign; pp. 147-152; Year of Publication: 2001.*

Stewart, C.; Kai Shen; Dwarkadas, S.; Scott, M.L.; Jian Yin; "Profile-Driven Component Placement for Cluster-Based Online Services"; Distributed Systems Online, IEEE; vol. 5 Issue:10; Issue Date: Oct. 2004.*

Cheatheam, et al., Ergonomic Method for Memory Determination, IBM Technical Disclosure Bulletin, Jan. 1987, pp. 1-87.

Lin et al., Dynamic Load Sharing for Distributed Computing Environment, IBM Technical Disclosure Bulletin, Jul. 1995, pp. 511-516.

Summers, Definition and Measurement Method of 'Working Set' When Analyzing Memory Utilization in OS/2, IBM Technical Disclosure Bulletin, Jul. 1990, p. 186.

* cited by examiner

*Primary Examiner* — Charles Swift
(74) *Attorney, Agent, or Firm* — Yudell Isidore PLLC; Matthew Baca (57) ABSTRACT

A system, method, and program product for scheduling applications in a data processing system. The method of the invention includes a step of monitoring memory availability within the data processing system during execution of one or more applications. The method further includes recording a memory usage history for one or more applications from which a memory requirement may be determined. A kernel scheduler is utilized to schedule a next application for execution in accordance with the memory availability and the determined memory requirements of the one or more monitored applications.

20 Claims, 5 Drawing Sheets

TASK SCHEDULING POLICY FOR LIMITED MEMORY SYSTEMS

BACKGROUND OF THE INVENTION

1. Technical Field

The present invention relates generally to data processing systems, and in particular, to systems and methods for scheduling task execution to provide improved reliability while maintaining acceptable runtime performance.

2. Description of the Related Art

Data processing systems utilize a multitasking approach to handle parallel execution of multiple processes or tasks. Multitasking operations are typically controlled by an operating system executive referred to as the "kernel." The kernel generally provides an interface between the central processing unit (CPU) and the tasks or processes to be executed. The kernel schedules the execution of the tasks in a manner such that the CPU is shared by all of the concurrently running applications in the system. In this manner, the kernel effectively controls which task has "possession" of the CPU at a given time.

Conventional kernel schedulers determine task possession of the CPU in accordance with a queueing order in which priority and readiness levels are assigned to each task. Typically, the CPU continues execution of a task until it blocks or a system event triggers task rescheduling. The running task is interrupted and "suspended," and another task, which is selected based on or more factors such as priority, usage penalty, etc., gains possession of the CPU resource and is executed. Task interruption in this manner often occurs many times prior to completion of the task. Upon completion of the higher priority tasks, the CPU is voluntarily surrendered such that the multiple-suspended lower priority tasks are eventually completed.

Tasks in a multitasking environment may be designated as having one of three basic states. An "active" task presently has control of the CPU and is being executed. Only one task is active at any given time on a typical single CPU system. An "inactive" task is neither being executed nor awaiting execution (e.g. a task waiting for an I/O to complete). A "ready" task is waiting for CPU time (i.e., suspended or otherwise waiting to be executed). Upon occurrence of an input/output (I/O) event, an associated task may switch between an "active" and "inactive" state. A task scheduler is typically utilized to switch between the ready and active states. The kernel maintains a dynamic list or queue to organize the ready tasks so that they are executed in accordance with their priority. For purposes of description herein, a "task" is alternately referred to as a thread or process.

Interruption of an active task and setting up the state of another task (e.g. thread) for execution, is referred to as context switching. Context switching requires that the machine state registers (storing the execution state) of the interrupted task be saved to memory such that the task execution state may be restored when the task's active status is restored. Also, the kernel maintains the run queue in which tasks are queued. Other kernel components such as an I/O manager may request rescheduling responsive to a higher priority task having entered the ready state from an inactive state. The associated functions of continuous priority review and context switching substantially impacts throughput of priority tasks.

Managing memory resources is a key feature of any multitasking system. Modern operating systems employ memory managers that, in conjunction with hardware, support so-called virtual memory in which applications use "virtual addresses" to access memory. During program execution, the virtual addresses are converted into real memory addresses enabling the virtual memory to feature fault isolation among applications. Furthermore, virtual memory uses a paging technique in which larger and less expensive storage devices, such as hard disk space, is used to effectively extend the amount of available memory beyond what is provided by the systems "real memory," typically random access memory (RAM).

A problem arises in many systems, such as embedded systems, in which memory resources may be constrained in a manner that has implications for task scheduling and execution. Embedded systems are special-purpose systems that provide a sub-function in a large, complex system such as a service processor in a large multiprocessor system, or which may be completely encapsulated by its host device. In addition to service processors, embedded systems are implemented in mobile telephones, personal data assistants, automatic teller machines, computer printers, and other special purpose devices.

In an embedded environment, both real memory, dynamic random access memory (DRAM), for example, and persistent storage in the form of programmable read-only memory (PROM), such as Flash memory, are limited due to space and budget constraints. Use of virtual memory paging techniques is particularly impractical when the alternate, persistent storage resources are circuit-based (Flash memory, for example) rather that magnetic or optical disk media, the cost per byte is greater than for the real memory itself.

As a result of the foregoing, applications running in embedded systems are limited by the amount of available physical memory. In such systems, if an application requests more memory than is presently available, a fatal error and termination of one or more program threads may result.

Under many operating systems, an "out of memory" condition is addressed by the kernel, which either selects a process/thread to terminate or fails an application requesting memory. For most computer systems, such as personal computers having substantial memory capacity and disk space that are further leveraged using virtual memory paging, an out of memory condition rarely occurs. In case the condition does arise, these systems usually select a non-vital process to terminate such that a system wide failure is avoided.

For specialized systems, such as embedded systems that perform system-critical functions and have limited memory resources, an out of memory condition may result in a system crash not readily recoverable from. It can therefore be appreciated that a need exists for a method and system for performing process multitasking in a manner addressing memory resource limitation constraints. The present invention addresses this and other needs unaddressed by the prior art.

SUMMARY OF THE INVENTION

A system, method, and program product for scheduling applications in a data processing system are disclosed herein. The method of the invention includes a step of monitoring memory availability within the data processing system during execution of one or more applications. The method further includes recording a memory usage history for one or more applications from which a memory requirement may be determined. A kernel scheduler is utilized to schedule a next application for execution in accordance with the memory availability and the determined memory requirements of the one or more monitored applications.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention provides a mechanism by which an operating system kernel or functionally equivalent device or entity schedules tasks, referred hereinafter in the alternative as "threads," for processing in a limited memory system. As explained below in further detail with reference to the figures, task scheduling decisions are preferably based in part on the level of presently available memory (free pages in physical memory, for example) and the memory requirement as determined or predicted from the memory usage history of one or more active or soon-to-be-active application processes. In a preferred embodiment, the memory usage history of a given application includes several statistically significant metrics such as average and peak as well as standard deviation metrics relating to memory usage of the application. Such memory usage history is preferably tracked, recorded, and updated in a memory usage table. Predicted memory requirement values for the respective applications may be derived from the memory usage history data maintained in the memory usage table.

Figure 1:
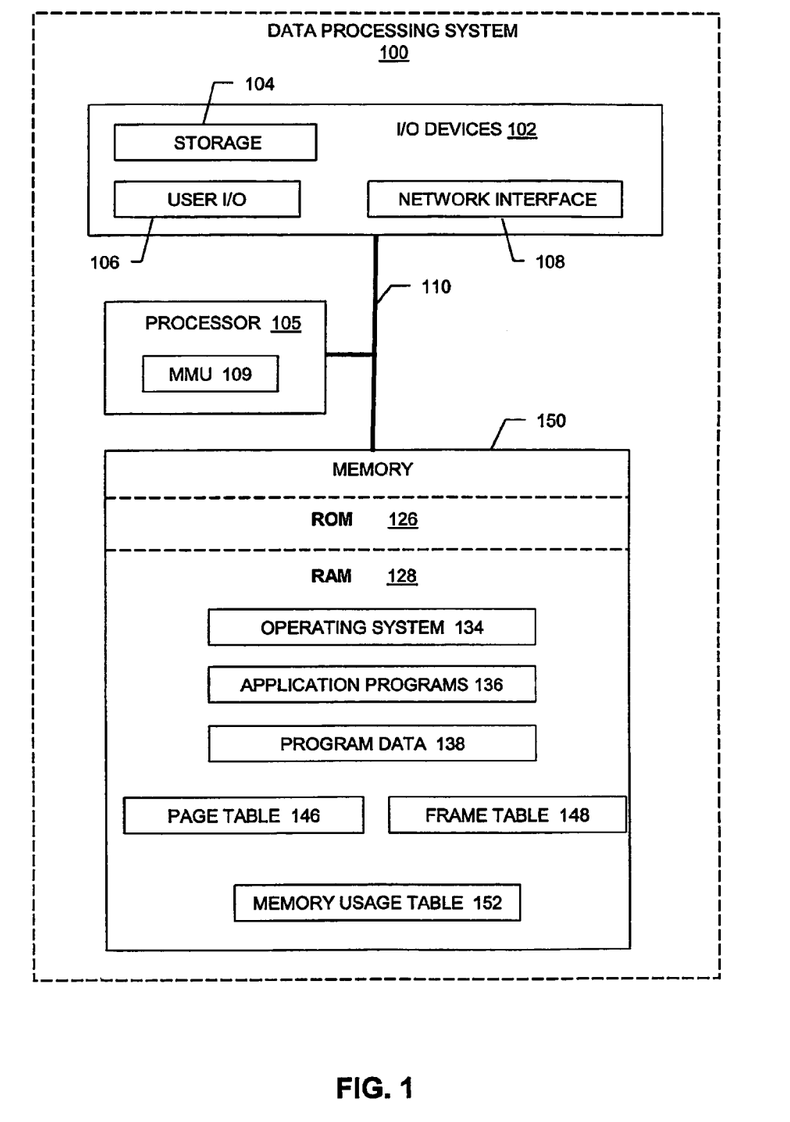
FIG. 1 is a high-level block diagram of a data processing system adapted for implementing a preferred embodiment of the present invention.

With reference now to the figures, wherein like reference numerals refer to like and corresponding parts throughout, and in particular with reference to FIG. 1, there is depicted a high-level block diagram illustrating a data processing system 100 adapted for implementing the present invention. As shown in FIG. 1, data processing system 100 generally comprises a processor 105, such as a central processing unit (CPU), coupled via a bus or interconnect 110 to multiple input/output (I/O) devices 102, and a memory 150. I/O devices 102 may include a storage device 104, user input/output (I/O) 106, and a network interface device 108.

Processor 105 may represent one or more central processing units of any type of architecture, such as CISC (Complex Instruction Set Computing), RISC (Reduced Instruction Set Computing), VLIW (Very Long Instruction Word), or a hybrid architecture, although any appropriate processor may be used. Processor 105 executes instructions for controlling system operation. In support of its control function, processor 105 reads and/or stores code and data to/from memory 150. Although not depicted in FIG. 1, processor 105 may include a variety of other elements not necessary to understanding the present invention. For example, processor 105 may typically include a variety of execution units for executing instructions during a processor cycle, a bus interface unit for interfacing to interconnect 110, a fetcher for fetching instructions, and queues and/or caches for holding instructions and data. In other embodiments, processor 105 includes other appropriate elements well known to those skilled in the art.

Processor 105 includes a memory management unit (MMU) 109 that accesses a page table 146 and a frame table 148 stored in memory 150. Page table 146 may itself comprise a one or more memory pages that describe the memory addressing space of data processing system 100. Page table 146 generally comprises page table entries identifying the virtual pages in memory 150, and the page frames in which those pages are contained. To this end, the page table entries of page table 146 contain various data fields and flags. In accordance with one embodiment such fields preferably include a presence flag that indicates whether the page is currently in memory 150, a modified flag indicating whether the page data has been modified while in memory 150, a page frame number (or other identifier) identifying the frame and thus the location in memory of the page.

The frame identifier included within the page table entries of page table 146 serves as an index into a frame table 148, which is also maintained by an operating system 134 in support of memory addressing. While page table 146 designates the identity and status of each page currently stored in memory 150, frame table 148 includes entries corresponding to each memory frame that cumulatively describe current utilization (for example frames currently allocated to pages versus free frames) of memory 150.

Memory management unit 109 is typically a hardware component which utilizes the information from page table 146 to perform virtual to physical address translation. The functions of the memory management unit 109 are further described below with reference to FIGS. 3 and 4. Although memory management unit 109 is depicted within the block representing processor 105, in alternate embodiments, memory management unit 109 may be implemented fully or partially outside processor 105.

As will be described in detail below, aspects of an embodiment of the invention pertain to specific apparatus and method elements implemented on a computer, processor, or other electronic device. In another embodiment, the invention may be implemented as a program product for use with a computer, processor, or other electronic device. The executable instructions defining the functions of this embodiment may be performed by electronic hardware and/or may be delivered to the computer, processor, or other electronic device via a variety of signal-bearing media, which include, but are not limited to:

(1) information permanently stored on a non-rewriteable storage medium, e.g., a read-only memory device attached to or within a computer, processor, or other electronic device, such as a CD-ROM readable by a CD-ROM drive;

(2) alterable information stored on a rewriteable storage medium, e.g., a hard disk drive or diskette; or (3) information conveyed to a computer, processor, or other electronic device by a communications medium, such as through a computer or a telephone network, e.g., the network 104, including wireless communications.

Such signal-bearing media, when carrying machine-readable instructions that direct the functions of the present invention, represent embodiments of the present invention.

Operating system 134 is persistently maintained within non-volatile storage 126 and loaded in part or in whole into volatile memory 128 during system startup and operation. Operating system 134 of the present invention may include many of the features of standard high-performance operating systems, such as IBM's AIX®.

Memory 150 is typically utilized to store various applications or other instructions which, when invoked, enable processing resources within processor 105 to perform various tasks. Among the programs stored in memory 150 are operating system 134 which executes on processor 105 and includes the task scheduling application of the present invention. Memory 150 also includes various application programs 136, which together share the resources of processor 105, and program related data 138. Processing of application programs 136 is typically broken down to "processes" and "threads" which are scheduled by the thread scheduler of the present invention.

As relates to the scheduling mechanism and process of the present invention, tasks or threads assume one of three basic states: an inactive state wherein the thread is suspended and is not ready for execution; a ready state in which the thread is requesting a processor resource but is still not executing; and an active state in which the thread is executing and receiving the requested resources from the processor. In a single CPU system, only one thread may be executing at any given point in time. To service all threads requesting processing resources, threads must be transitioned between the ready and active states. Further, although the above-described states represent the basic operating states of each thread, many systems incorporate additional states to represent various operating conditions and behaviors, such as during thread initialization and termination. However, such additional states are not directly relevant to the present invention.

Figure 2:
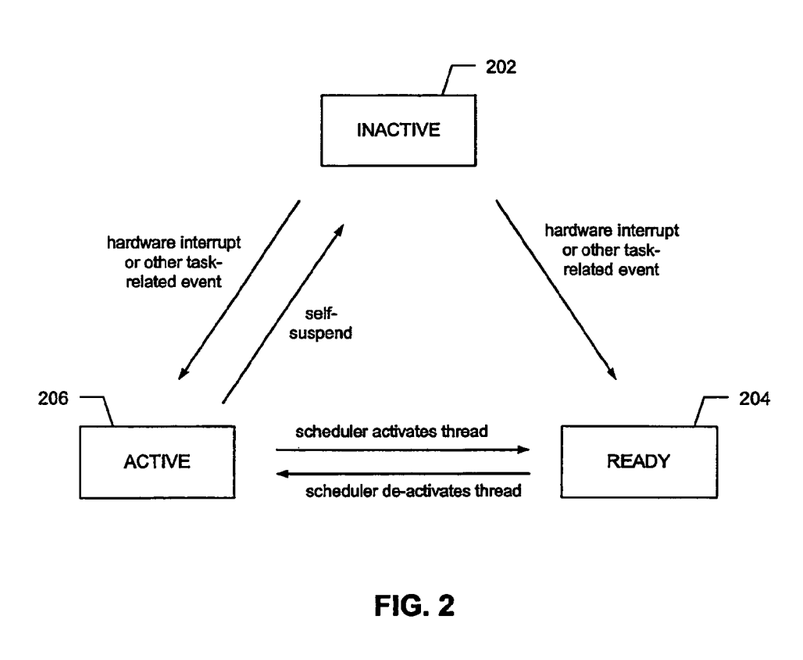
FIG. 2 is a flow diagram illustrating state transitions for process threads.

Referring to FIG. 2, there is shown a simplified flow diagram illustrating possible thread state transitions. An initial thread state 202 represents an inactive state in which the thread is neither requesting nor receiving any processor resources. Threads currently in the inactive state 202 may transition to either the ready state 204 or the active state 206 responsive to a system event requiring processor resources. Such an event may be an external hardware event, such as an interrupt or an action by another application process task.

Figures 3A, 3B:
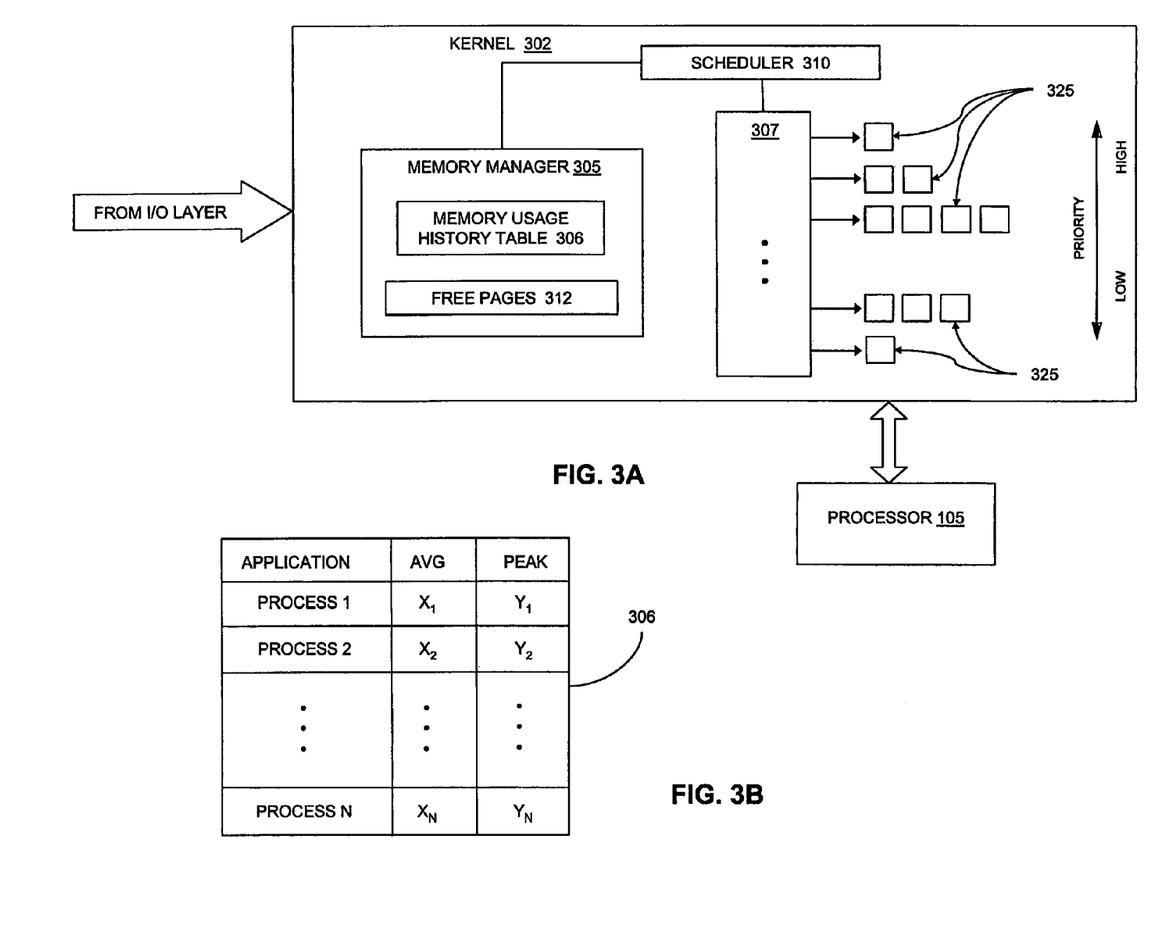
FIG. 3A is a high-level schematic depiction of data processing system elements adapted and utilized for scheduling applications in accordance with the present invention.
FIG. 3B illustrates a memory usage table utilized for tracking memory utilization metrics of one or more processes applications in accordance with the present invention.

The circumstances and timing with which a thread transitions between the ready state 204 and active state 206 depends on the thread scheduling policy established for the system. The details of the scheduling process and mechanism of the present invention are explained in further detail below. Threads may transition between the active and ready states as directed by a thread scheduler, such as a thread scheduler 310 depicted and explained in further detail below. Since thread schedulers generally do not have the ability to transition threads to the inactive state, threads that are no longer in the inactive state may not transition back to the inactive state except through a direct action of the thread itself.

In the depicted embodiment of FIG. 1, data processing system 100 implements a form of page-type memory management. In computer operating systems, paging memory allocation algorithms divide computer memory into small partitions, and allocates memory using a "page" as the smallest building block. Various aspects of the present invention may be performed utilizing other memory management systems and techniques such as buddy and dynamic memory allocation in conjunction with page memory management.

Referring to FIG. 3A, there is illustrated a high-level schematic depiction of data processing system elements adapted and utilized for scheduling applications in accordance with the present invention. As further depicted in FIG. 3A, operating system 134 is represented by an interrupt-driven kernel 302 which maintains a task ready queue 307 from which tasks (e.g. process threads) 325 are queued when in the ready state in accordance with a specified thread scheduling policy.

The I/O layer 102 communicates with and presents various processing events to the kernel 302, which in turn communicates with processor 105. Kernel 302 includes several modules that are utilized in handling the process events or "tasks". One of the modules is a task scheduler 310 which selects a thread from a ready queue 307 to execute. Threads that are placed into run queue 307 may be sent from several possible sources, including the I/O layer 102, other functions of operating system 134, etc. In accordance with the present invention, and as explained in further detail below with reference to FIGS. 4A-4C, task scheduler 310 schedules tasks (threads in the following examples), for execution by processing resources provided by processor 105. To this end, scheduler 310 implements one or more scheduling policies by which threads 325 are scheduled to be run using processing resources within processor 105.

Consistent with conventional task schedulers, scheduler 310 may incorporate scheduling timers (not depicted) for generating time slots, with each time slot corresponding to a timeslice during which processor resources are allocated to a particular one of threads 325. Furthermore, and as depicted in FIG. 3A, threads 325 are positioned and dispatched from ready queue 307 in a prioritized (high to low) ordering determined by scheduler 310, which preferably implements several priority management tools to manipulate process, and correspondingly thread, priority.

Kernel 302 maintains a priority value (sometimes referred to as a scheduling priority) for each of threads 325. The priority value may be, for example, a positive integer that varies inversely with the importance of the associated thread. That is, a smaller priority value indicates a more important (i.e. higher priority) thread. In the depicted embodiment, when scheduler 310 is looking for a thread to dispatch, it chooses the dispatchable thread with the smallest priority value.

The task scheduling implemented by scheduler 310 is preferably dynamic, using one or more priority criteria in determining which thread to run next. Such priority setting criteria may include application-specific priority, processor-usage penalty, and others. In accordance with the present invention, scheduler 310 further uses memory-related metrics in making scheduling decisions.

As further depicted in FIGS. 3A and 3B, kernel 302 further maintains a memory usage history table 306 in which is stored one or more memory usage history metric data for one of one or more specified applications. The memory usage history data may include memory usage metrics reflecting the average and peak memory usage of respective applications. Memory usage history table 306 is updated upon the exit of one of the monitored applications (one of Process 1 through Process N). Specifically, upon exit of a monitored process, Process$_m$, from the execution environment (termination of an execution run), memory manager 305 updates the corresponding memory usage history metrics $X_m$ and $Y_m$ within memory usage history table 306 in accordance with the memory usage of Process$_m$ during the run. In a preferred embodiment, the memory usage data for the monitored applications, Process 1-Process N, is maintained cumulatively and is updated for each application run. Memory usage history table 306 and its data is preferably preserved and periodically update in a persistent data storage medium, such as a Flash memory, such that the memory usage history data is preserved through an operating system reboot. Kernel 302 further tracks a free pages field 312 designating the amount of presently available memory in terms of free pages determined from frame table 148 or otherwise. In addition to other priority setting criteria, scheduler 310 utilizes memory usage information contained in memory usage history table 306 to determine or possibly revise the prioritization of corresponding applications.

Figure 4A:
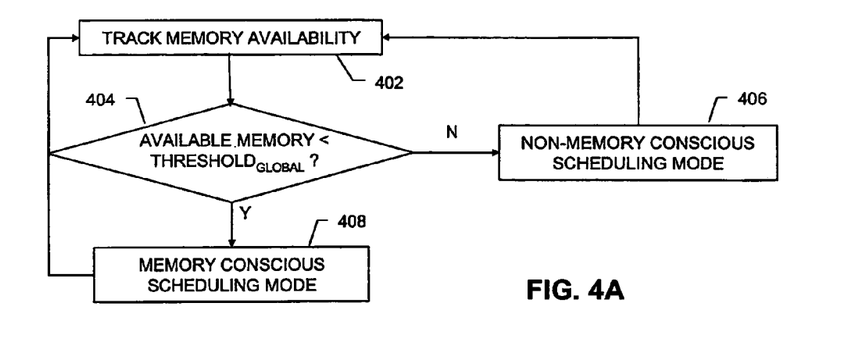
FIG. 4A is a high-level flow diagram illustrating steps performed in selecting a scheduling mode in accordance with one embodiment of the present invention.

FIG. 4A is a high-level flow diagram illustrating steps performed by the data processing system and kernel 302 in selecting a scheduling mode in accordance with one embodiment of the present invention. As shown at step 402, kernel 302 tracks the amount of memory, in terms of the value maintained in the free pages field 312 or otherwise, available to be utilized for processing. In a preferred embodiment, the scheduling method and system of the present invention is implemented in an embedded system or other system that does not utilize virtual memory paging techniques and is therefore limited by the amount of available real memory. In such an embodiment, the memory availability tracked as shown at step 402 reflects the amount of physical memory that is available to be used for processing threads.

The process continues as illustrated at step 404 with a determination of whether the presently available memory, determined at step 402, is less than a global available memory threshold level. If not, the data processing system, and specifically kernel 302, maintains or enters a non-memory conscious scheduling operating mode as depicted at step 406. While operating in the non-memory conscious scheduling mode, kernel 302, and more specifically scheduler 310, schedules threads 325 using conventional thread prioritization criteria including user specified priority settings, processor usage penalties, etc.

Memory availability tracking (step 402) determines whether the system operates in non-memory conscious scheduling mode until the amount of free memory is less than the global available memory threshold (step 404). As depicted at step 408, in response to determining that the amount of free memory has dropped to or below the global threshold, kernel 302 and scheduler 310 enter memory conscious scheduling mode. In accordance with the present invention, and as depicted and explained with reference to FIG. 4B, memory conscious scheduling of threads uses data pertaining to the present level of available memory as recorded in free pages field 312 and the memory usage of one or more applications as recorded in memory usage history table 306 as the primary or additional prioritization criteria.

Figure 4B:
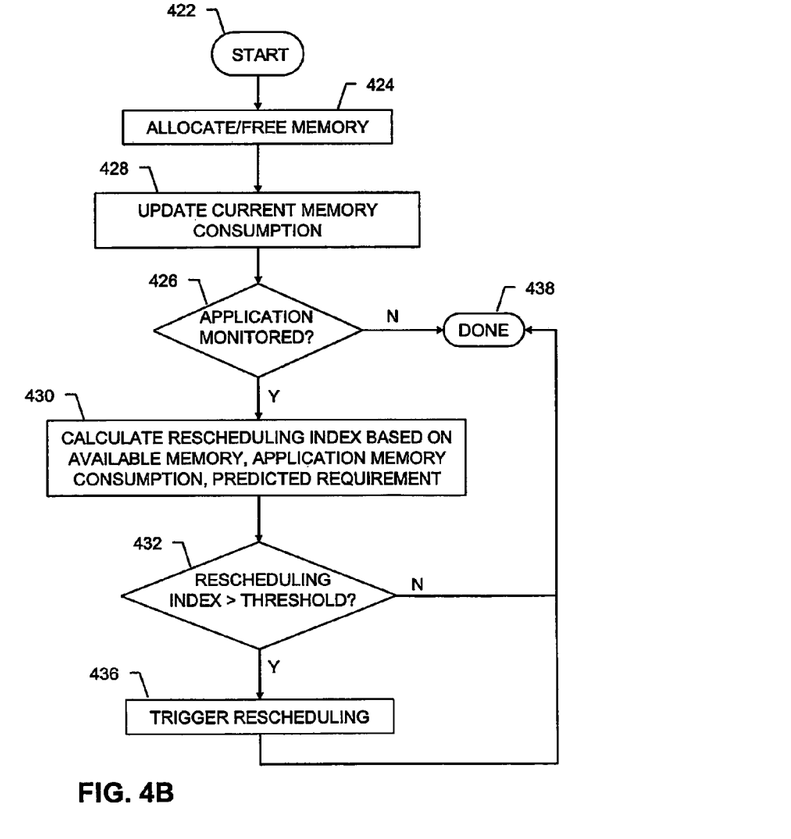
FIG. 4B is a high-level flow diagram depicting steps performed by a memory manager during memory conscious scheduling in accordance with the present invention.

Referring to FIG. 4B, there is illustrated a high-level flow diagram depicting steps performed by a memory manager 305 during memory conscious scheduling in accordance with the present invention. The process begins as shown at steps 422 and 424 with memory manager 305 allocating or freeing memory for an application. The memory consumption of the application is updated accordingly. As illustrated at inquiry step 426, memory manager 305 determines whether or not the application is one of the applications for which memory consumption is monitored for scheduling purposes such as in memory usage history table 306. Note that memory consumption is tracked by kernel 302 for each application (monitored or unmonitored). Memory usage history table 306 is updated for the monitored application at the exit of the task. Referring back to FIG. 3B in conjunction with FIG. 4B, a more detailed view of the structure of memory usage table 306 is depicted. As shown in FIG. 3B, memory usage table 306 tracks a number, N, of applications that may be specified at system startup using root user privilege to be monitored by kernel 302 for task scheduling. The set of specified applications may be a complete list of executables on the system or a subset having higher than average memory usage requirements and consequently a higher probability of causing an "out of memory" condition. For each of the N applications specified in this manner, kernel 302 generates one of the N records, each associating, an average and peak memory usage associated with the corresponding application.

The scheduling process of FIG. 4B continues as depicted at step 430, with memory manager 305 computing a rescheduling index for the application. The rescheduling index is preferably a numeric value computed as a function, at least in part, of the presently available memory and the actual and predicted memory usage of the application. The memory availability factor used in the rescheduling index computation may be taken or derived from the value contained in free pages field 312. The predicted memory usage factor(s) are preferably determined from the memory usage metrics tracked and updated in table 306.

Next, as shown at step 432, memory manager 305 compares the computed rescheduling index with a specified threshold value to determined whether sufficient memory resources are currently available for the application for which memory is to be allocated/freed. If not, and as represented in the depicted embodiment by the rescheduling index being greater than the threshold, memory manager 305 sends a signal instructing scheduler 310 to reschedule the application. If, on the other hand, memory manager 305 determines, by comparing the rescheduling index value with the threshold value, that there is sufficient memory availability for the application, memory manager 305 completes the allocation/freeing of memory per request as usual.

Figure 4C:
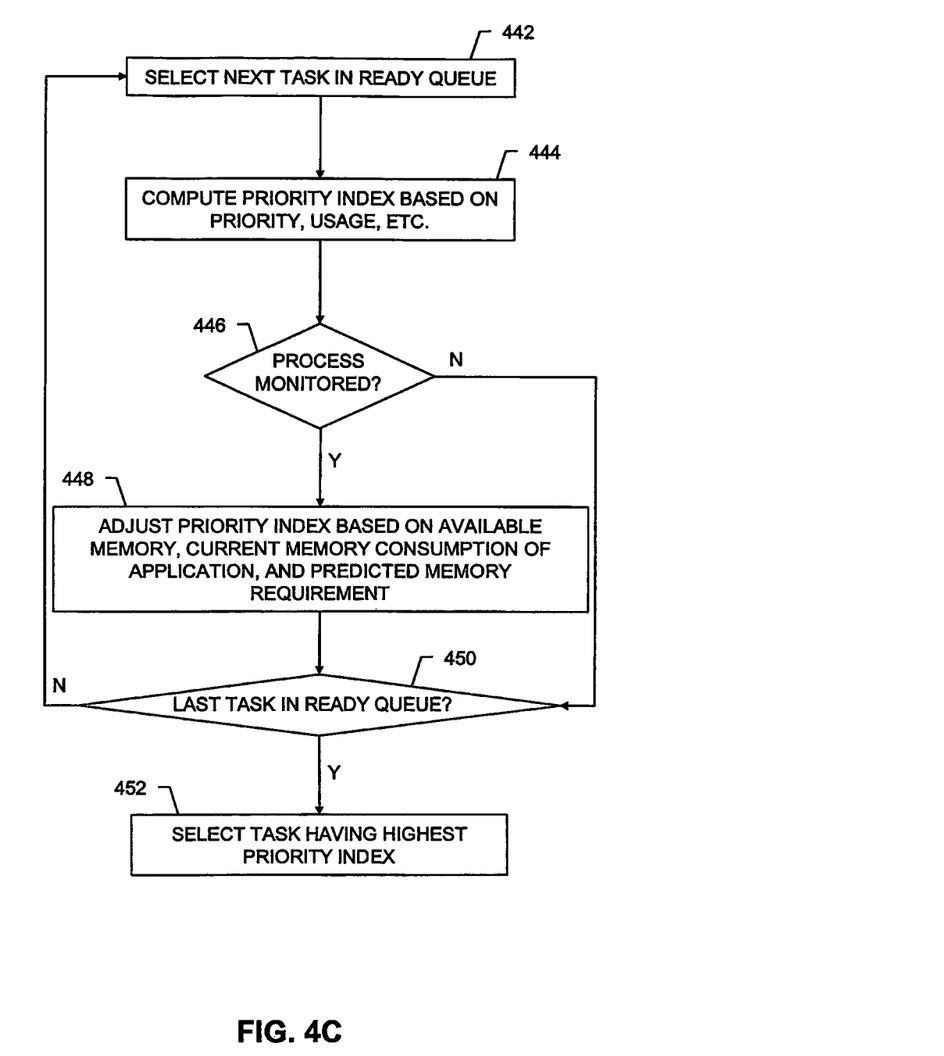
FIG. 4C is a high-level flow diagram illustrating steps performed by a task scheduler during memory conscious scheduling in accordance with the present invention.

FIG. 4C is a high-level flow diagram illustrating steps performed by a task scheduler, such as scheduler 310, during memory conscious scheduling in accordance with the present invention. The process begins with scheduler 310 iterating to select a next thread 325 (or equivalent "task") in ready queue 307 as depicted at step 442. Scheduler 310 computes a priority index for the selected thread which is used by the scheduler for determining the order in which the threads in ready queue 307 will be allocated processing resources for execution (step 444). The priority index value is preferably computed using conventional thread prioritization factors such as application priority, processor usage, and other scheduler prioritization criteria.

Next, as illustrated at step 446, scheduler 310 determines whether the process or application represented by the selected thread is among the applications monitored as part of the memory conscious scheduling of the present invention. If, as may be determined from memory manager 305 or otherwise, the application (or process) represented by the thread is monitored by memory manager 305 in the manner shown in FIG. 4B as part of the scheduling processing, scheduler 310 adjusts the priority index value computed at step 444 based on the memory availability and memory usage metrics of the application as determined from the free pages field 312 and memory usage history table 306 of memory manager 305 (step 448). For example, it the presently available memory is less than the determined or otherwise estimated or predicted memory requirement for the application represented by the thread, the prioritization index may be adjusted downward such that the corresponding thread is queued behind other threads 325 whose memory requirements can be readily satisfied.

If, as determined at step 446, the application represented by the thread is not monitored by memory manager 305 in the manner shown in FIG. 4B as part of the scheduling processing, scheduler 310 does not adjust the prioritization index.

Following either the adjustment depicted at step 448 or a determination at step 446 that the priority index will not be adjusted, the process continues to step 450 with a determination of whether the thread is the last task to be scheduled in ready queue 307. If not, scheduler 310 repeats the process for the next thread in ready queue 307 as shown at steps 450 and 442. As shown at step 452, after scheduler 310 has computed and adjusted, as necessary, the priority indices for all of the threads in ready queue 307, scheduler 310 selects for allocation of processing resources the thread within ready queue 307 having the highest priority index.

The system of the present invention uses predictive methods of memory usage and current free memory status in conjunction with process priority and time slicing to make scheduling decisions. The invention avoids killing tasks after the fact of "out of memory" and instead gathers the memory requirements of applications based on the execution history and utilizes this information to decide whether to schedule a process at its turn or to bypass it when the available memory is insufficient. In this manner, the scheduling policy of the present invention may delay the completion of some applications in exchange for a smoother process to process transitioning.

While the invention has been particularly shown and described with reference to a preferred embodiment, it will be understood by those skilled in the art that various changes in form and detail may be made therein without departing from the spirit and scope of the invention. These alternate implementations all fall within the scope of the invention.

What is claimed is:

1. In a data processing system, a method for scheduling applications comprising:
   monitoring memory availability within said data processing system;
   recording, within a memory usage history table, a memory usage history for one or more monitored applications, wherein said recording includes updating memory usage metrics of each monitored application when a monitored process of the monitored application exits an execution run, wherein the memory usage metrics are updated in accordance with memory usage of the monitored process during the execution run, and wherein memory usage metrics for a monitored application are maintained cumulatively and is updated within the table for each application run;
   determining if a present amount of available memory, recorded within a free pages field, is less than or equal to a global available memory threshold;
   in response to determining that the amount of available memory is less than or equal to the global available memory threshold:
      entering a memory conscious scheduling mode, wherein during the memory conscious scheduling mode the amount of available memory recorded within the free pages field and an amount of memory usage of the one or more applications recorded in the memory usage history table are utilized as at least one of a primary prioritization criteria or one of a plurality of prioritization criteria;
      scheduling a next application for execution in accordance with a memory availability and the memory usage history of the one or more monitored applications and in accordance with the memory conscious scheduling mode by:
         computing a rescheduling index for the application, wherein the rescheduling index is a numeric value computed as a function of the presently available memory and actual and predicted memory usage of the application;
         wherein a memory availability factor utilized in computing the rescheduling index is derived from the value contained in the free pages field, and the predicted memory usage is determined from the memory usage metrics tracked and updated in the memory usage history table;
         comparing the computed rescheduling index with a specified threshold value to determine whether sufficient memory resources are currently available for the application; and
         if there is not sufficient memory resources currently available, sending, from a memory manager to a scheduler, a signal instructing the scheduler to reschedule the application; and
   in response to determining that the amount of available memory is greater than the global available memory threshold, exiting the memory conscious scheduling mode.

2. The method of claim 1, further comprising:
   determining a memory requirement for one of said one or more applications from the recorded memory usage history, wherein the memory requirement is an amount of memory one of said one or more monitored applications requires to properly function;
   wherein specified applications that are monitored applications are applications having higher than average memory usage requirements; and
   wherein only applications selected as monitored applications are monitored for scheduling purposes in the memory usage history table and the memory usage history table tracks a number of applications specified at system start up using root user privilege to be monitored by a kernel for task scheduling with one record generated for each monitored application.

3. The method of claim 1, wherein the applications comprise processes having one or more threads, said data processing system utilizing process prioritization scheduling for scheduling applications for execution, said scheduling further comprising:
   scheduling a next application for execution in accordance with:
      a priority level assigned to a process thread; and
      the amount of available memory and the recorded memory usage history of the one or more monitored applications;
   assigning a priority index to each application;
   adjusting a priority index value of each monitored application based on the memory availability and memory usage metrics of the monitored application as determined form the fee pages field and the memory usage history table of the memory manager; and
   following completion of the computing of the rescheduling index for the application and any necessary adjustment of priority indices for all threads in a ready queue, selecting for allocation of processing resources, a thread within the ready queue that has the highest priority index.

4. The method of claim 1, further comprising:
generating a table for recording memory usage history of each monitored application;
storing the memory usage history table and preserving memory usage history table data within a persistent data storage such that the memory usage history table data is preserved through an operating system reboot; and
tracking via an operating system kernel a free pages field designating an amount of presently available memory in terms of free pages determined from a frame table.

5. The method of claim 4, said recording memory usage further comprising recording at least one of peak, minimum, and average memory usage amounts of the monitored applications.

6. The method of claim 5, further comprising predicting memory usage of one or more of the monitored applications based on the peak and average memory usage, wherein the predicted memory usage is an expected amount of memory that the one or more of the monitored applications may consume.

7. The method of claim 6, said scheduling comprising determining, in accordance with the predicted memory usage of one or more of the monitored applications and in accordance with the memory conscious scheduling mode, whether or not to dispatch a process thread for execution;
wherein the method for scheduling applications is implemented in an embedded system that does not utilize virtual memory paging techniques and is limited by an amount of available real memory, wherein tracking of an amount of available memory reflects the amount of physical memory that is available to be utilized for processing threads.

8. In a data processing system having a processor and a memory, a system for scheduling applications comprising the processor performing the functions of:
monitoring memory availability within said data processing system;
recording, within a memory usage history table, a memory usage history for one or more monitored applications, wherein said recording includes updating memory usage metrics of each monitored application when a monitored process of the monitored application exits an execution run, wherein the memory usage metrics are updated in accordance with memory usage of the monitored process during the execution run, and wherein memory usage metrics for a monitored application are maintained cumulatively and is updated within the table for each application run;
determining if a present amount of available memory, recorded within a free pages field, is less than or equal to a global available memory threshold;
determining a memory requirement for one of said one or more applications from the recorded memory usage history, wherein the memory requirement is an amount of memory one of said one or more applications requires to properly function;
in response to determining that the amount of available memory is less than or equal to the global available memory threshold:
entering a memory conscious scheduling mode, wherein during the memory conscious scheduling mode the amount of available memory recorded within the free pages field and an amount of memory usage of the one or more applications recorded in the memory usage history table are utilized as at least one of a primary prioritization criteria or one of a plurality of prioritization criteria;
scheduling a next application for execution in accordance with the memory availability and the memory usage history of the one or more monitored applications and in accordance with the memory conscious scheduling mode by:
computing a rescheduling index for the application, wherein the rescheduling index is a numeric value computed as a function of the presently available memory and actual and predicted memory usage of the application;
wherein a memory availability factor utilized in computing the rescheduling index is derived from the value contained in the free pages field, and the predicted memory usage is determined from the memory usage metrics tracked and updated in the memory usage history table;
comparing the computed rescheduling index with a specified threshold value to determine whether sufficient memory resources are currently available for the application; and
if there is not sufficient memory resources currently available, sending, from a memory manager to a scheduler, a signal instructing the scheduler to reschedule the application; and
in response to determining that the amount of available memory is greater than the global available memory threshold, exiting the memory conscious scheduling mode.

9. The system of claim 8, wherein the applications comprise processes having one or more threads, said data processing system utilizing process prioritization scheduling for scheduling applications for execution, said scheduling further comprising:
scheduling a next application for execution in accordance with:
a priority level assigned to a process thread; and
the amount of available memory and the recorded memory usage history of the monitored applications;
assigning a priority index to each application;
adjusting a priority index value of each monitored application based on the memory availability and memory usage metrics of the monitored application as determined form the fee pages field and the memory usage history table of the memory manager; and
following completion of the computing of the rescheduling index for the application and any necessary adjustment of priority indices for all threads in a ready queue, selecting for allocation of processing resources, a thread within the ready queue that has the highest priority index.

10. The system of claim 8, further comprising the processor:
generating a table for recording memory usage history of each monitored application;
storing the memory usage history table and preserving memory usage history table data within a persistent data storage such that the memory usage history table data is preserved through an operating system reboot; and
tracking via an operating system kernel a free pages field designating an amount of presently available memory in terms of free pages determined from a frame table.

11. The system of claim 10, said recording memory usage further comprising recording at least one of peak, minimum, and average memory usage amounts of the monitored applications.

12. The system of claim 11, further comprising the processor predicting memory usage of one or more of the monitored applications based on the peak and average memory usage, wherein the predicted memory usage is an expected amount of memory that the one or more of the monitored applications may consume.

13. The system of claim 12, said scheduling comprising determining, in accordance with the predicted memory usage of one or more of the monitored applications and in accordance with the memory conscious scheduling mode, whether or not to dispatch a process thread for execution.

14. In a data processing system, a non-transitory computer-readable medium having encoding thereon computer-executable instructions for scheduling applications, said computer-executable instructions performing a method comprising:
monitoring memory availability within said data processing system;
recording, within a memory usage history table, a memory usage history for one or more monitored applications, wherein said recording includes updating memory usage metrics of each monitored application when a monitored process of the monitored application exits an execution run, wherein the memory usage metrics are updated in accordance with memory usage of the monitored process during the execution run, and wherein memory usage metrics for a monitored application are maintained cumulatively and is updated within the table for each application run;
determining if a present amount of available memory, recorded within a free pages field, is less than or equal to a global available memory threshold;
in response to determining that the amount of available memory is less than or equal to the global available memory threshold:
entering a memory conscious scheduling mode, wherein during the memory conscious scheduling mode the amount of available memory recorded within the free pages field and an amount of memory usage of the one or more applications recorded in the memory usage history table are utilized as at least one of a primary prioritization criteria or one of a plurality of prioritization criteria;
scheduling a next application for execution in accordance with the memory availability and the memory usage history of the one or more monitored applications and in accordance with the memory conscious scheduling mode by:
computing a rescheduling index for the application, wherein the rescheduling index is a numeric value computed as a function of the presently available memory and actual and predicted memory usage of the application;
wherein a memory availability factor utilized in computing the rescheduling index is derived from the value contained in the free pages field, and the predicted memory usage is determined from the memory usage metrics tracked and updated in the memory usage history table;
comparing the computed rescheduling index with a specified threshold value to determine whether sufficient memory resources are currently available for the application; and
if there is not sufficient memory resources currently available, sending, from a memory manager to a scheduler, a signal instructing the scheduler to reschedule the application; and in response to determining that the amount of available memory is greater than the global available memory threshold, exiting the memory conscious scheduling mode.

15. The non-transitory computer-readable medium of claim 14, wherein said method further comprises:
determining a memory requirement for one of said one or more applications from the recorded memory usage history, wherein the memory requirement is an amount of memory one of said one or more monitored applications requires to properly function;
wherein specified applications that are monitored applications are applications having higher than average memory usage requirements; and
wherein only applications selected as monitored applications are monitored for scheduling purposes in the memory usage history table and the memory usage history table tracks a number of applications specified at system start up using root user privilege to be monitored by a kernel for task scheduling with one record generated for each monitored application.

16. The non-transitory computer-readable medium of claim 14, wherein the applications comprise processes having one or more threads, said data processing system utilizing process prioritization scheduling for scheduling applications for execution, said scheduling further comprising:
scheduling a next application for execution in accordance with:
a priority level assigned to a process thread; and
the amount of available memory and the recorded memory usage history of the monitored applications;
assigning a priority index to each application;
adjusting a priority index value of each monitored application based on the memory availability and memory usage metrics of the monitored application as determined form the fee pages field and the memory usage history table of the memory manager; and
following completion of the computing of the rescheduling index for the application and any necessary adjustment of priority indices for all threads in a ready queue, selecting for allocation of processing resources, a thread within the ready queue that has the highest priority index.

17. The non-transitory computer-readable medium of claim 14, said method further comprising:
generating a table for recording memory usage history of each monitored application;
storing the memory usage history table and preserving memory usage history table data within a persistent data storage such that the memory usage history table data is preserved through an operating system reboot; and
tracking via an operating system kernel a free pages field designating an amount of presently available memory in terms of free pages determined from a frame table.

18. The non-transitory computer-readable medium of claim 17, said recording memory usage further comprising recording at least one of peak, minimum, and average memory usage amounts of the monitored applications.

19. The non-transitory computer-readable medium of claim 18, said method further comprising predicting memory usage of one or more of the monitored applications based on the peak and average memory usage, wherein the predicted memory usage is an expected amount of memory that the one or more of the monitored applications may consume.

20. The non-transitory computer-readable medium of claim 19, said scheduling comprising determining, in accordance with the predicted memory usage of one or more of the monitored applications and in accordance with the memory conscious scheduling mode, whether or not to dispatch a process thread for execution.

* * * * *